(12) United States Patent
Corriher

(10) Patent No.: US 12,721,249 B2
(45) Date of Patent: Sep. 1, 2026

(54) RIPPER SHANK, SHANK HOLDER, AND GROUND ENGAGING IMPLEMENT FOR USING THE SAME

(71) Applicant: Theodore H. Corriher, Terrell, NC (US)

(72) Inventor: Theodore H. Corriher, Terrell, NC (US)

( * ) Notice: Subject to any disclaimer, the term of this patent is extended or adjusted under 35 U.S.C. 154(b) by 977 days.

(21) Appl. No.: 17/670,476

(22) Filed: Feb. 13, 2022

(65) Prior Publication Data

US 2022/0267986 A1 Aug. 25, 2022

Related U.S. Application Data

(60) Provisional application No. 63/152,977, filed on Feb. 24, 2021.

(51) Int. Cl.

| | |
|---|---|
| ***A01B 15/02*** | (2006.01) |
| ***E02F 3/815*** | (2006.01) |
| ***E02F 5/32*** | (2006.01) |
| *E02F 3/76* | (2006.01) |

(52) U.S. Cl.

CPC ............ *A01B 15/025* (2013.01); *E02F 3/815* (2013.01); *E02F 5/32* (2013.01); *E02F 3/7604* (2013.01)

(58) Field of Classification Search

CPC . E02F 5/32; E02F 3/815; E02F 9/2875; E02F 3/7604; A01B 15/025

USPC .................................... 172/699, 700; 37/370

See application file for complete search history.

(56) References Cited

U.S. PATENT DOCUMENTS

| | | | | | |
|---|---|---|---|---|---|
| 461,537 | A * | 10/1891 | Lindgren | ............. | A01B 15/025 172/753 |
| 2,222,071 | A * | 11/1940 | Gustafson | ............. | E02F 9/2875 172/762 |
| 3,058,243 | A | 10/1962 | McGee | | |
| 3,171,500 | A * | 3/1965 | Dils, Jr. | ............... | A01B 35/225 172/722 |

(Continued)

OTHER PUBLICATIONS

'TRK Attachments Manufacturing', <http://www.trkattachments.com/>, published/dated Dec. 22, 2019, captured via <https://web.archive.org/web/20191222103114/http://www.trkattachments.com:80/> on Nov. 16, 2024. (Year: 2019).*

(Continued)

*Primary Examiner* — Christopher J Sebesta
*Assistant Examiner* — Joel F. Mitchell
(74) *Attorney, Agent, or Firm* — Muncy, Geissler, Olds & Lowe, P.C.

(57) ABSTRACT

An attachment for an industrial or farm vehicle is designed to engage, carry, cut, disturb and/or level dirt at a ground surface, such as a box blade, rake or bucket. Ripper shanks may be adjustably mounted to the attachment, so that a depth of loosening of the ground surface may be controlled. Each ripper shank includes a generally flat metal plate having a rectangular portion, a curved portion, and a triangular portion. A dirt lifting slide is attached to the triangular portion at a position between a top edge and a bottom edge. The top edge may include serrated teeth to cut roots and loosen dirt before the dirt is lifted by the slide. An opening or channel is formed near a top edge of the rectangular portion, which functions as a handle to assist in mounting and adjusting the ripper shank relative to its holder.

17 Claims, 7 Drawing Sheets

(56) References Cited

U.S. PATENT DOCUMENTS

| | | | | | |
|---|---|---|---|---|---|
| 3,387,668 | A * | 6/1968 | Mathers | A01B 35/225 172/700 |
| 3,394,765 | A * | 7/1968 | Davis | E02F 5/32 172/744 |
| 3,430,703 | A | 3/1969 | Richey | |
| 3,460,634 | A * | 8/1969 | Mathers | A01B 15/025 172/708 |
| 3,492,019 | A * | 1/1970 | Folkerts | B62D 49/085 280/759 |
| 3,536,147 | A * | 10/1970 | Norton et al. | A01B 13/08 37/453 |
| 4,232,883 | A * | 11/1980 | Bourgeous et al. | B62D 49/085 180/312 |
| 4,269,274 | A * | 5/1981 | Robertson et al. | A01B 15/025 172/699 |
| 4,415,042 | A * | 11/1983 | Cosson | A01B 15/025 172/725 |
| 4,899,830 | A * | 2/1990 | Maguina-Larco | E02F 9/2825 172/699 |
| 5,769,171 | A | 6/1998 | Newman, IV | |
| 5,794,714 | A | 8/1998 | Brown | |
| 5,911,279 | A | 6/1999 | Whitener | |
| 6,845,576 | B2 | 1/2005 | Vennard et al. | |
| 7,478,682 | B1 | 1/2009 | Keigley | |
| 7,540,331 | B1 | 6/2009 | Keigley | |
| 7,866,270 | B2 * | 1/2011 | Ankenman | A01C 7/203 172/138 |
| 8,657,024 | B2 | 2/2014 | Fraley et al. | |
| 10,024,029 | B1 | 7/2018 | Ruiz | |
| 2009/0050340 | A1 | 2/2009 | McIntyre | |

OTHER PUBLICATIONS

"1200 Series Gladiator 3-Point Mounted Toolbar Models Owner's Manual," Printed Dec. 2011 (see labeled p. 2), Kuhn Krause, pertinent pp. labeled 14 and 24-25 (Year: 2011).*

"1205 Series Gladiator Pull-Type Toolbar Owner's Manual," Printed May 2019 (see labeled p. 2), Kuhn Krause, pertinent pp. labeled 15 and 27-28 (Year: 2019).*

No-Till Farmer, "Sly Launches New Stripcat II Strip-Till Unit," Apr. 5, 2017, YouTube, <https://www.youtube.com/watch?v=xdQYF3sk9OU> (Year: 2017).*

* cited by examiner 11A
17
24
23
26
21
13A
13A
15

17
26
59
163
107
137
161A
127
163A
163
161
161B
81
XI
XI
163B
24
25
23
13A
13A
13A
13A
25
25
59
21
15
26
11A

RIPPER SHANK, SHANK HOLDER, AND GROUND ENGAGING IMPLEMENT FOR USING THE SAME

This application claims the benefit of U.S. Provisional Application No. 63/152,977, filed Feb. 24, 2021, which is herein incorporated by reference.

BACKGROUND OF THE INVENTION

1. Field of the Invention

The present invention relates to a ripper shank for an industrial or farm vehicle. More particularly, the present invention relates to a ripper shank for soil ripping, loosening and/or cultivating. The present invention also relates to a shank holder for adjustably mounting the ripper shank relative to a vehicle carried attachment.

2. Description of the Related Art

Ground engaging implements to rip, loosen and generally disturb the top layer of soil are well known in the industrial and farm vehicle art. For example, a box blade implement is a land sculpting implement, which can be used to level or grade soil to a desired angle to control water drainage and make areas suitable for building foundations, lawns, gardens, etc. Examples of a box blade implement can be seen in U.S. Pat. Nos. 3,058,243; 3,430,703; 5,769,171; 5,911,279 and 8,657,024, which are all herein incorporated by reference.

FIG. 1 is a perspective view of a box blade attachment 11 in accordance with the prior art. The attachment 11 has a three-point hitch formed by framework 13 for connection to a vehicle, e.g., a farm tractor or an industrial vehicle, like a skid steer or bulldozer. The box blade attachment 11 is primarily formed of first and second side plates 15 and 17, a rear plate 19 and a forward box beam 21.

A forward facing, curved blade 23 is mounted to the rear plate 19. The forward blade 23 may be replaceable and mounted to the rear plate 19 by plural fasteners 25, such as bolts and nuts. Several ripper shanks 27 are mounted to the forward box beam 21. Each ripper shank 27 passes through aligned slots cut into the forward box beam 21. A straight rectangular portion of the ripper shank 27 includes a series of through holes 29. A pin 31 is passed through a mounting bracket 33, attached, e.g., welded, to the forward box beam 21. A spring clip (not shown) is attached to the pin 31 on the opposite side of the ripper shank 27 and hold the pin 31 in place. A dirt lifting slide 35 is attached to a forward, top edge 37 of each ripper shank 27 and presents an inclined surface to lift dirt upwardly.

In operation, the box blade attachment 11 is mounted behind the vehicle, e.g., the tractor. As the tractor is driven forward, the ripper shanks 27, mounted proximate a front of the box blade attachment 11, dig into the soil and loosen the soil. The forward blade 23, mounted to the back, lower edge of the rear plate 19 of the box blade attachment 11, rolls soil into the area between the first and second side plates 15 and 17 and the rear plate 19. This captured soil moves forward as the tractor is driven forward.

The forward blade 23 cuts off the high spots on the ground surface and may also allow captured soil to pass under the forward blade 23 and fall into the low spots in the ground. After numerous passes, the upper surface of the ground can be made relatively smooth, and high spots of ground can be cut down and low spots in the ground may be filled in.

The depth of the ripper shanks 27, e.g., the length of the ripper shanks 27 which extend below the forward blade 23, determine how much soil is loosened. If a tall and/or large mound of soil needs to be moved in order to make an area flat, the ripper shanks 27 may be moved well below the forward blade 23, so as to loosen more soil and quickly fill the box blade attachment 11 with soil that can be pulled away from the tall mound. As the height of the mound is lowered, it may be desirable to shorten the distance that the ripper shanks 27 extend below the forward blade 23, so that thinner layers of soil are loosened and moved by the box blade attachment 11. During final leveling or grading operations, the ripper shanks 27 are often lifted to a level above the forward blade 23, or entirely removed from the box blade attachment 11, so that no trenches of loosened soil will be created and only the forward blade 23 will engage the top of the ground to leave a smooth top surface.

SUMMARY OF THE INVENTION

The Applicant has appreciated drawbacks in the ripper shanks and mounting systems of the prior art.

In the prior art, the ripper shank 27 is typically formed in an L or J shape. The dirt lifting slide 35 is mounted to the forward, top edge 37 of the ripper shank 27. The dirt lifting slide 35 is formed as a flat plate at an angle of about forty-five degrees relative to the forward travel direction of the vehicle. The dirt lifting plate serves to cut a narrow trench into compacted soil and lift dirt upwardly out of the trench. To secure the dirt lifting slide 35 to the top, forward edge 37 of the ripper shank 27, first and second welds are used between a bottom of the dirt lifting slide 35 and the side walls of the ripper shank 27.

The applicant has appreciated that the dirt lifting slides 35 are the initial point of direct contact with the compacted soil. This places a great deal of stress on the dirt lifting slide 35, which may tend to break the welds holding the dirt lifting slide 35 to the top, forward edge 37 of the ripper shank 27.

Further, roots are often present in the areas of soil being moved by the box blade attachment 11. The roots will be completely embedded into the soil and will impact across the front face of the dirt lifting slide 35. Roots will tend to break a dirt lifting slide 35 free from the ripper shank 27 and may also travel over the dirt lifting slide 35 and tend to bend or break the ripper shank 27.

It is an object of the present invention to provide a securing system whereby the dirt lifting slide may be secured to the ripper shank in a more secured manner, e.g., by four welding surfaces, as opposed to two welding surfaces.

It is an object of the present invention to provide an additional narrow surface, in advance of the generally flat front face of the dirt lifting slide 35, which can cause an initial "wedging-like" breaking of compacted soil so as to reduce the stress placed upon the dirt lifting slide 35.

It is an object of the present invention to provide serrated teeth on the additional narrow surface so as to produce a "sawing" action on any roots, prior to the root encountering the dirt lifting slide 35. To this end, it is an object to additionally provide serrated teeth on the forward top edge of the ripper shank, so as to further cut and reduce the impact of any root onto the mid-sections of the ripper shank 27.

As noted in the description of the prior art, it is desirable to adjust the position of the ripper shank 27 relative to the forward blade 23 so as to control the "bite" of the ripper shank 27, e.g., the depth of the trench, which is cut by the ripper shank 27 as the vehicle is moving forward. The adjustments are most commonly manually made by the operator by removing the pin 31 and placing the pin 31 into a different through hole 29. Further, it is always a manual process to remove the ripper shank 27 from the box blade attachment 11.

The ripper shanks 27 may weight more than twenty-five pounds, e.g., thirty or thirty-five pounds. To reduce the depth of the ripper shank 27, a locking mechanism, such as a pin 31 is removed, and the operator uses a pinching force to hold the upper end of the ripper shank 27 and pull the ripper shank 27 upward to a new position. The ripper shank 27 is then held with one hand while the pin 31 is reinstalled to hold the ripper shank 27 in the elevated position. Due to the weight of the ripper shank 27, it can be difficult to manually pinch, pull and hold the top end of the ripper shank 27 during this adjustment.

If the box blade attachment 11 is elevated, it may be possible to use one hand to push up on the ripper shank 27 from the bottom. However, the bottom of the ripper shank 27 will typically be covered with dirt or mud, and may include very sharp edges due to prior impacts with rocks. Further, it is always best to avoid placing a hand, or any other part of the operator, beneath heavy equipment, due to the crush risk of a broken part falling or the hydraulics of the lifting system for the attachment failing.

It is an object of the present invention to provide a new structural feature at the top of the ripper shank 27 to assist the operator in lifting and holding the ripper shank 27 in an elevated position as the ripper shank 27 is adjusted within its mounting holder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
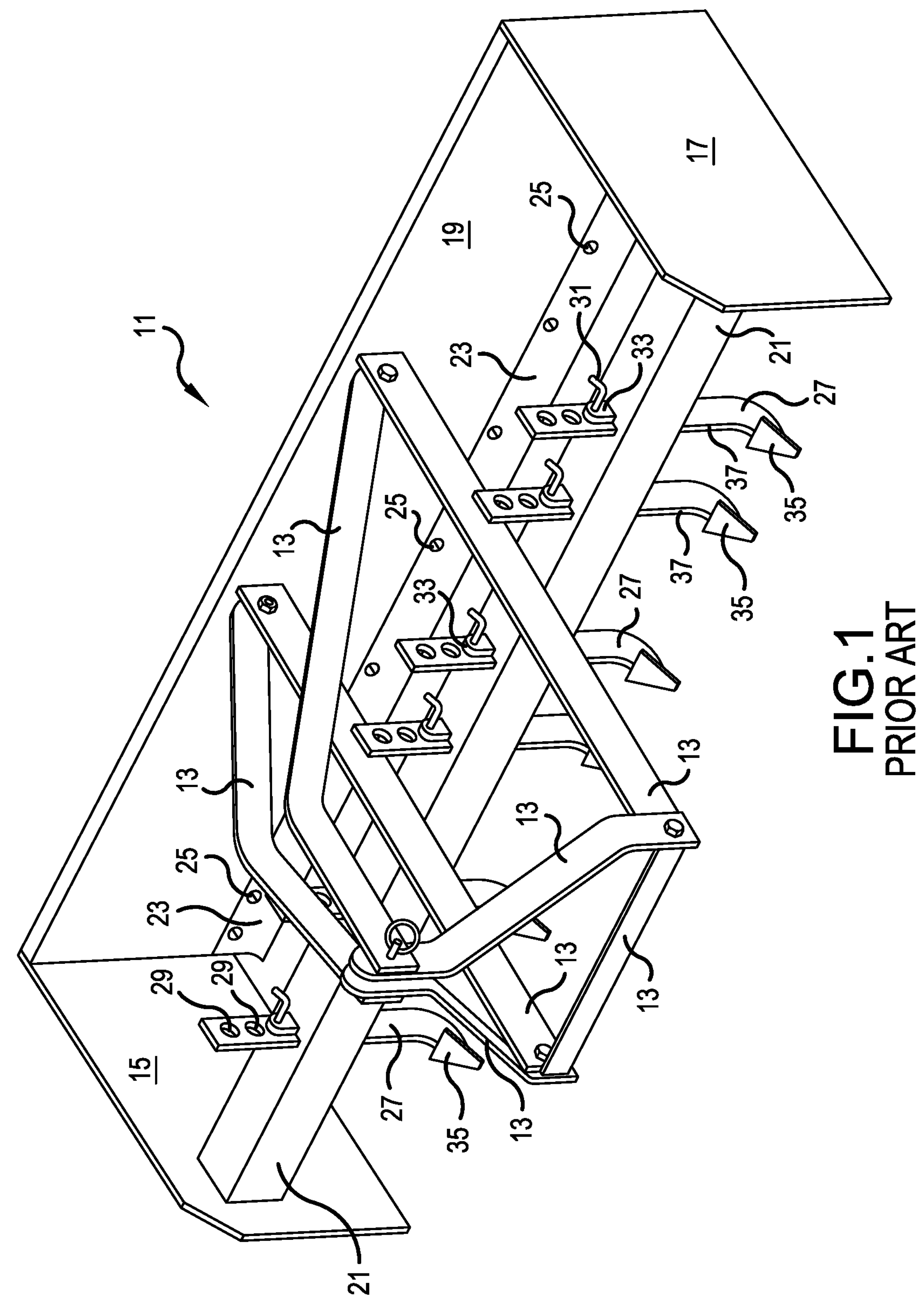
FIG. 1 is a front perspective view of a box blade attachment, according to the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. As used herein, phrases such as “between X and Y” and “between about X and Y” should be interpreted to include X and Y. As used herein, phrases such as “between about X and Y” mean “between about X and about Y.” As used herein, phrases such as “from about X to Y” mean “from about X to about Y.”

It will be understood that when an element is referred to as being “on”, “attached” to, “connected” to, “coupled” with, “contacting”, etc., another element, it can be directly on, attached to, connected to, coupled with or contacting the other element or intervening elements may also be present. In contrast, when an element is referred to as being, for example, “directly on”, “directly attached” to, “directly connected” to, “directly coupled” with or “directly contacting” another element, there are no intervening elements present. It will also be appreciated by those of skill in the art that references to a structure or feature that is disposed “adjacent” another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figures 2, 3:
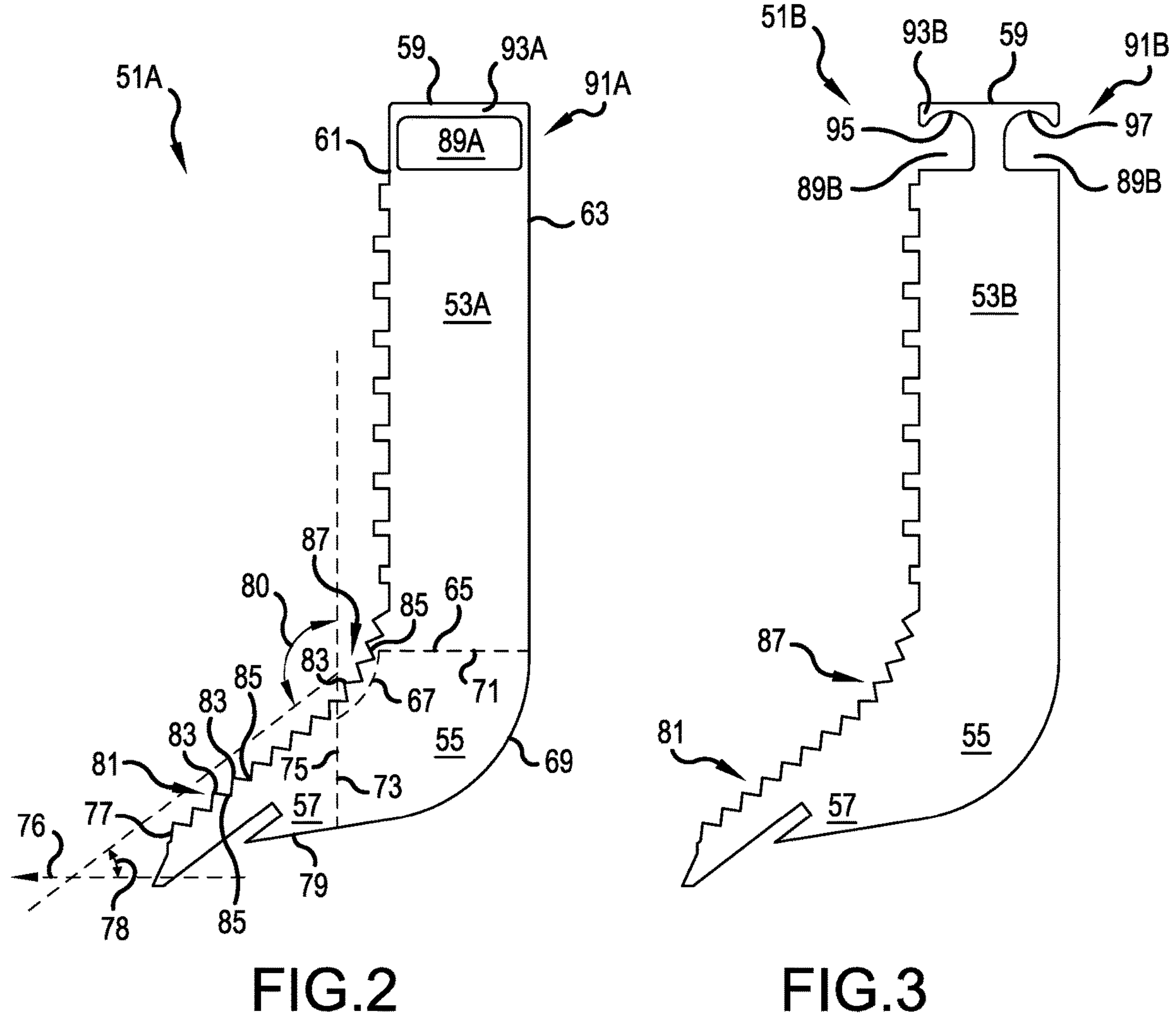
FIG. 2 is a side view of a ripper shank plate, in accordance with a first embodiment of the present invention.
FIG. 3 is a side view of a ripper shank plate, in accordance with a second embodiment of the present invention.

FIG. 2 is a side view of a ripper shank plate 51A, in accordance with a first embodiment of the present invention. The ripper shank plate 51A is part of a ground ripping implement, as will be further explained herein. The ripper shank plate 51A is formed as a generally flat metal plate residing in a first plane, e.g., the plane of the page depicting FIG. 2. The ripper shank plate 51A includes a generally rectangular portion 53A, a curved portion 55, and a generally triangular portion 57 all integrally formed as one piece. The curved portion 55 resides between the generally rectangular portion 53A and the generally triangular portion 57.

The generally rectangular portion 53A has a short edge 59 and opposed first and second long edges 61 and 63. A lower boundary 65 of the generally rectangular portion 53A, opposite the short edge 59, is integrally formed with the curved portion 55. The curved portion 55 has an inside curved edge 67 having an inner radius of curvature and an outside curved edge 69 having an outer radius of curvature, although each radius of curvature need not be a constant radius of curvature. An upper boundary 71 of the curved portion 55 extends between the inside curved edge 67 and the outside curved edge 69 and is integrally formed with the lower boundary 65 of the generally rectangular portion 53A. A forward boundary 73 of the curved portion 55 extends between the inside curved edge 67 and the outside curved edge 69. The generally triangular portion 57 includes a rearward boundary 75 integrally formed with the forward boundary 73 of the curved portion 55, a first side edge 77 and a second side edge 79.

A first plurality of serrated teeth 81 is formed by alternating peaks 83 and valleys 85 formed along the first side edge 77 of the generally triangular portion 57. The inside curved edge 67 of the curved portion 55 is continuous to the first long edge 61 of the generally rectangular portion 53A and the first side edge 77 of the generally triangular portion 57. A second plurality of serrated teeth 87 is formed by alternating peaks 83 and valleys 85 formed along at least a portion of, or all of, the inside curved edge 67 of the curved portion 55. The first and second pluralities of serrated teeth 81 and 87 are designed to engage roots within the ground at an initial angle 78 relative to the forward travel direction 76, such as at an angle of between ten to fifty degrees, such as twenty to forty degrees. The orientation between the first plurality of serrated teeth 81 and the second plurality of serrated teeth 87 may be set at a transition angle 80 between about ninety degrees and one hundred fifty degrees, such as one hundred ten degrees to one hundred thirty degrees. The initial angle 78 and the progressively changing transition angle 80 produce a "sawing" action which assists in cutting a root as the root encounters the first and second pluralities of serrated teeth 81 and 87, as the ripper shank plate 51A moves in the forward travel direction 76.

An opening or channel 89A is formed within the generally rectangular portion 53A adjacent to the short edge 59 and functions as a handle 91A. The opening 89A is spaced from the short edge 59 of the generally rectangular portion 53A by a barrier section 93A of the generally rectangular portion 53A.

FIG. 3 is a side view of a ripper shank plate 51B, in accordance with a second embodiment of the present invention. The second embodiment is the same as the first embodiment, except for the structuring of the handle 91B due to a changed opening or channel 89B. In FIG. 3, the handle 91B includes first and second finger recesses 95 and 97 within two channels 89B, which are spaced from the short edge 59 of the generally rectangular portion 53B by the barrier section 93B of the generally rectangular portion 53B.

Figure 4:
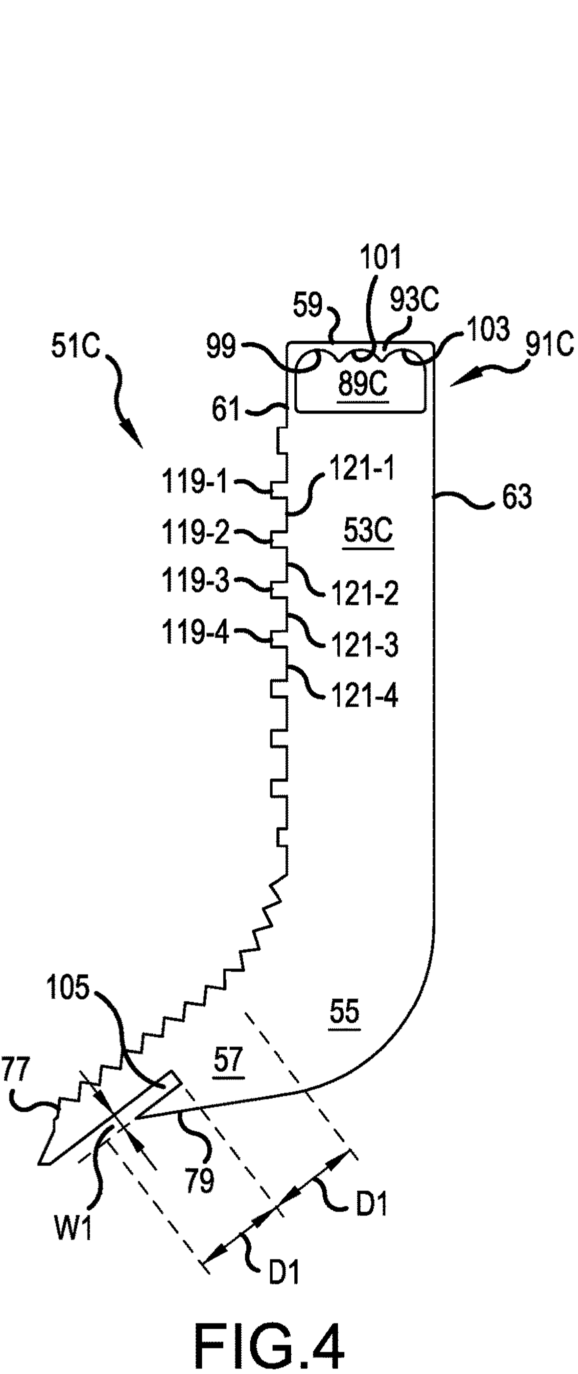
FIG. 4 is a side view of a ripper shank plate, in accordance with a third embodiment of the present invention.

FIG. 4 is a side view of a ripper shank plate 51C, in accordance with a third embodiment of the present invention. The third embodiment is the same as the first embodiment, except for the structuring of the handle 91C. In FIG. 4, the handle 91C includes first, second and third finger recesses 99, 101 and 103 within the opening 89C, which are spaced from the short edge 59 of the generally rectangular portion 53C by the barrier section 93C of the generally rectangular portion 53C.

Figure 5:
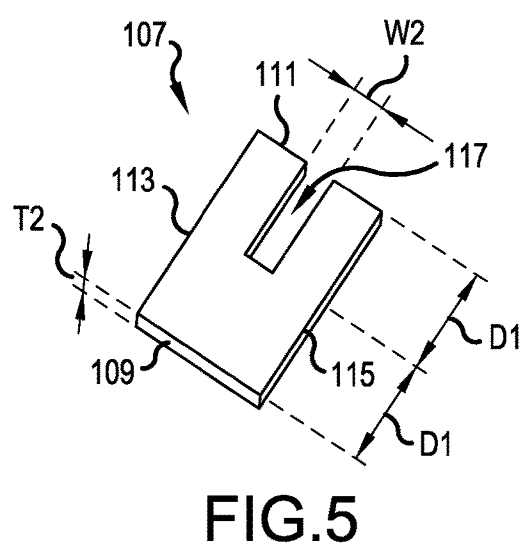
FIG. 5 is a front perspective view of a dirt lifting slide, in accordance with the present invention.

As best seen in FIG. 4, the generally triangular portion 57 includes a first slot 105. The first slot 105 enters within the second side edge 79 and extends toward the curved portion 55. FIG. 5 is a front perspective view of a dirt lifting slide 107. The dirt lifting slide 107 is formed as a generally flat rectangular plate, having first and second shorter sides 109 and 111 and first and second longer sides 113 and 115. A second slot 117 is formed within the second shorter side 111 of the dirt lifting slide 107. The second slot 117 extends into the dirt lifting slide 107 toward the first shorter side 109 a distance D1, which in a preferred embodiment, is approximately half of the length of the first longer side 113.

A first opening dimension, or width W1, of the first slot 105 exceeds a thickness T2 of the dirt lifting slide 107. Likewise, a second opening dimension, or width W2, of the second slot 117 exceeds a thickness T1 of the generally triangular portion 57. To install the dirt lifting slide 107, the second slot 117 is passed through the first slot 105 so as to seat slot edges of the second slot 117 against sidewall sections of the generally triangular portion 57 and/or the curved portion 55, and so as to seat slot edges of the first slot 105 against sidewall sections of the dirt lifting slide 107.

Figure 6:
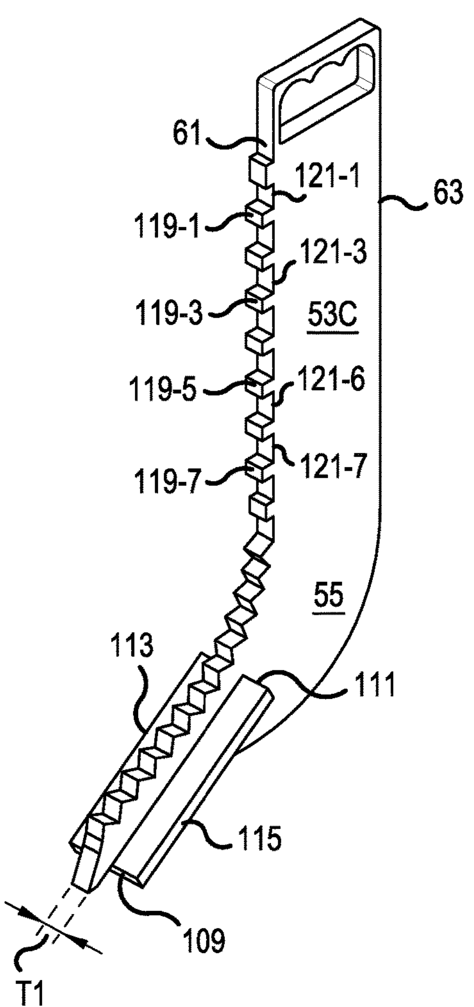
FIG. 6 is a front perspective view of the dirt lifting slide of FIG. 5 attached to ripper shank plate of FIG. 4 to form a ripper shank.

The dirt lifting slide 107, as installed upon the ripper shank plate 51C, is depicted in FIG. 6. When slid together, the dirt lifting slide 107 resides at a position between the first side edge 77 and the second side edge 79. The dirt lifting slide 107 is generally flat and extends away from the generally triangular portion 57 on both sides of the first plane, e.g., away from both sidewalls forming the generally triangular portion 57. The dirt lifting slide 107 resides in a second plane, which is generally perpendicular to the first plane, e.g., into and out of the page depicting FIG. 4. In a preferred embodiment, the dirt lifting slide 107 is generally parallel to the first side edge 77 of the generally triangular portion 57.

The dirt lifting slide 107 is then welded to the generally triangular portion 57 and/or the curved portion 55. Four welding areas are provided, i.e., the two abutments above the dirt lifting slide 107 and the two abutments below the dirt lifting slide 107. The ability to secure the dirt lifting slide 107 with four welds and the provision of having parts of the generally triangular portion 57 in abutment above and below the dirt lifting slide 107 will provide a much more secure attachment, as compared to the prior art solutions.

As best seen in FIG. 6, the first long edge 61 of the generally rectangular portions 53A, 53B and 53C includes a plurality of alternating protrusions 119-1, 119-2, 119-3, . . . 119-X and notches 121-1, 121-2, 121-3, . . . 121-X. The protrusions 119 are evenly spaced from each other, and the notches 121 are also evenly spaced from each other. The protrusions and notches 119 and 121 serve as features to secure the ripper shank plate 51A, 51B and 51C into a holder 127.

Figure 7:
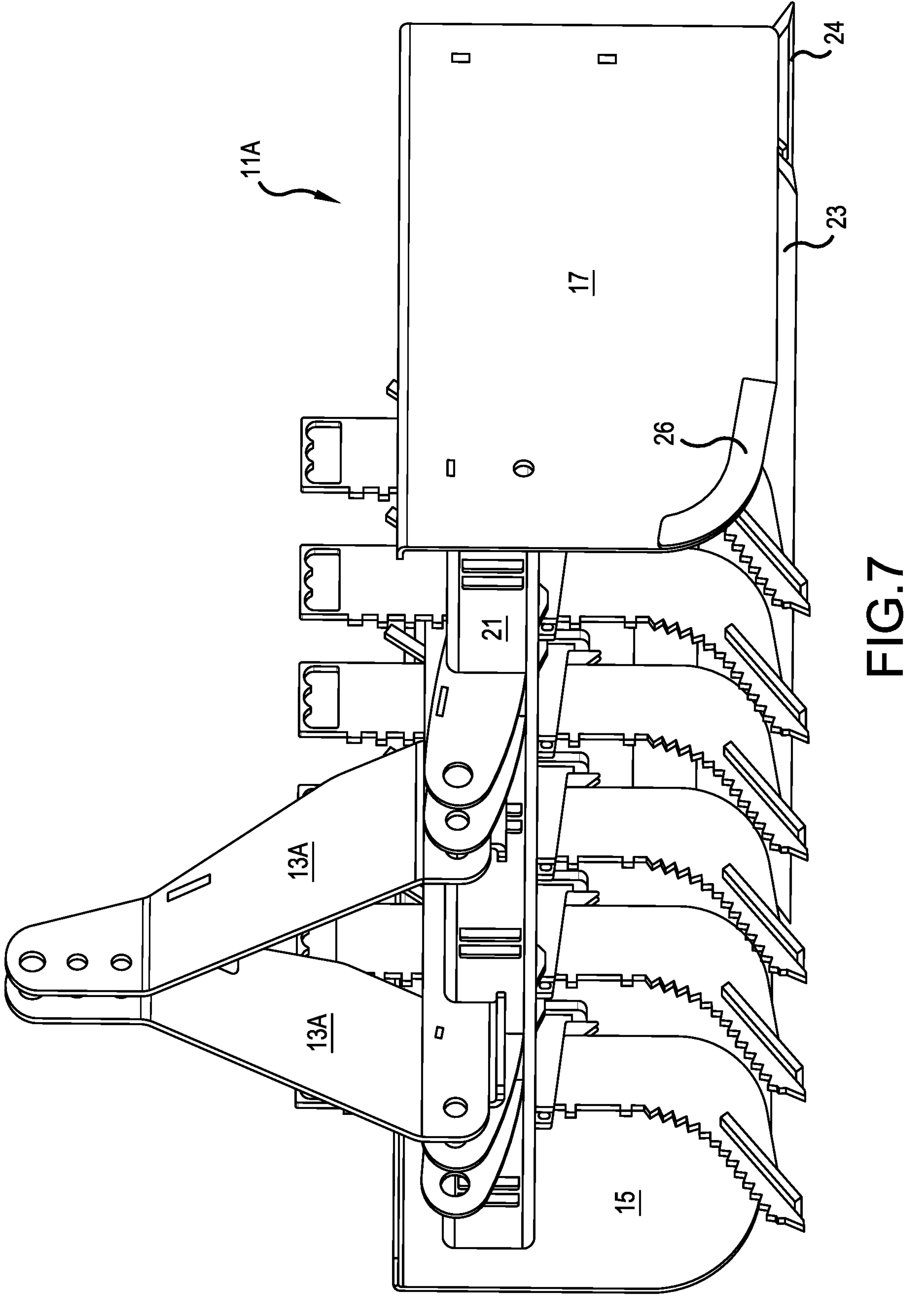
FIG. 7 is a front perspective view of a box blade attachment with the ripper shanks of FIG. 6 attached thereto.
Figure 8:
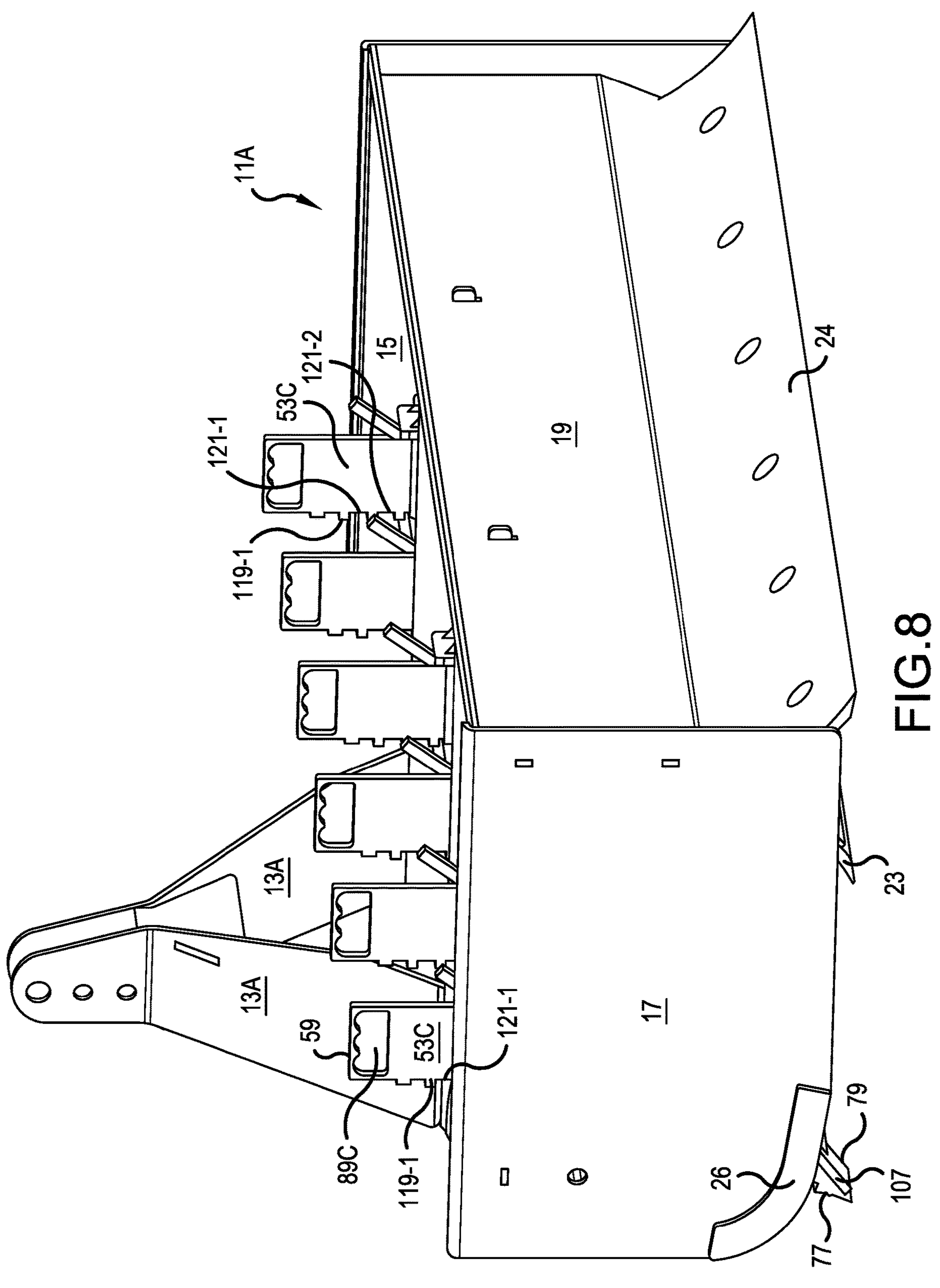
FIG. 8 is a rear perspective view of the box blade attachment of FIG. 7.
Figure 9:
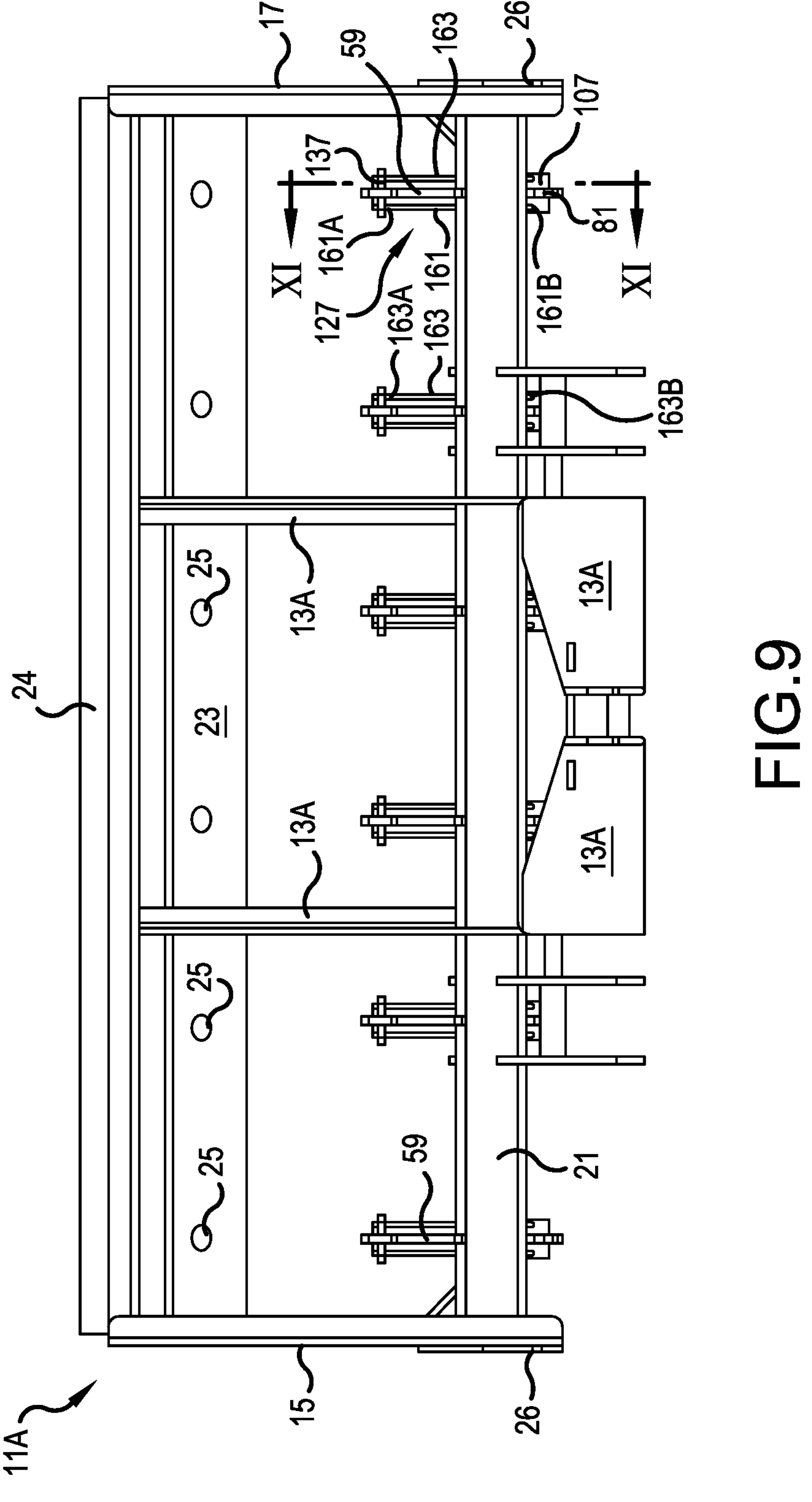
FIG. 9 is a top view of the box blade attachment of FIGS. 7 and 8.

The holder 127 may be mounted to the forward box beam 21 of a box blade attachment 11A, as shown in FIGS. 7-9. The box blade attachment 11A may include the conventional features of the first and second side plates 15 and 17, the rear plate 19, and the forward-facing blade 23 mounted to the rear plate 19 by plural fasteners 25. The box blade attachment 11A may also include optional structural improvements, like a rearward-facing blade 24, reinforcement plates 26 at high wear areas, and a more sturdy framework 13A with three-point hitch attachment features for connection to a vehicle, e.g., a farm tractor.

Figure 10:
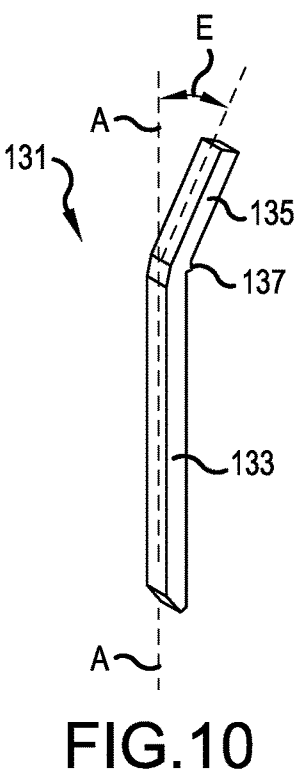
FIG. 10 is a front perspective view of locking pin, in accordance with the present invention.

FIG. 10 is a front perspective view of locking pin 131. The locking pin 131 has an elongated section 133 and a gripping section 135. The gripping section 135 is bent relative to the elongated section 133 and points away from an axis A of the elongated section 133 at an angle E of about ten to forty degrees, such as about twenty degrees. A rest stop 137 may be formed at the bend between the elongated section 133 and the gripping section 135.

Figure 11:
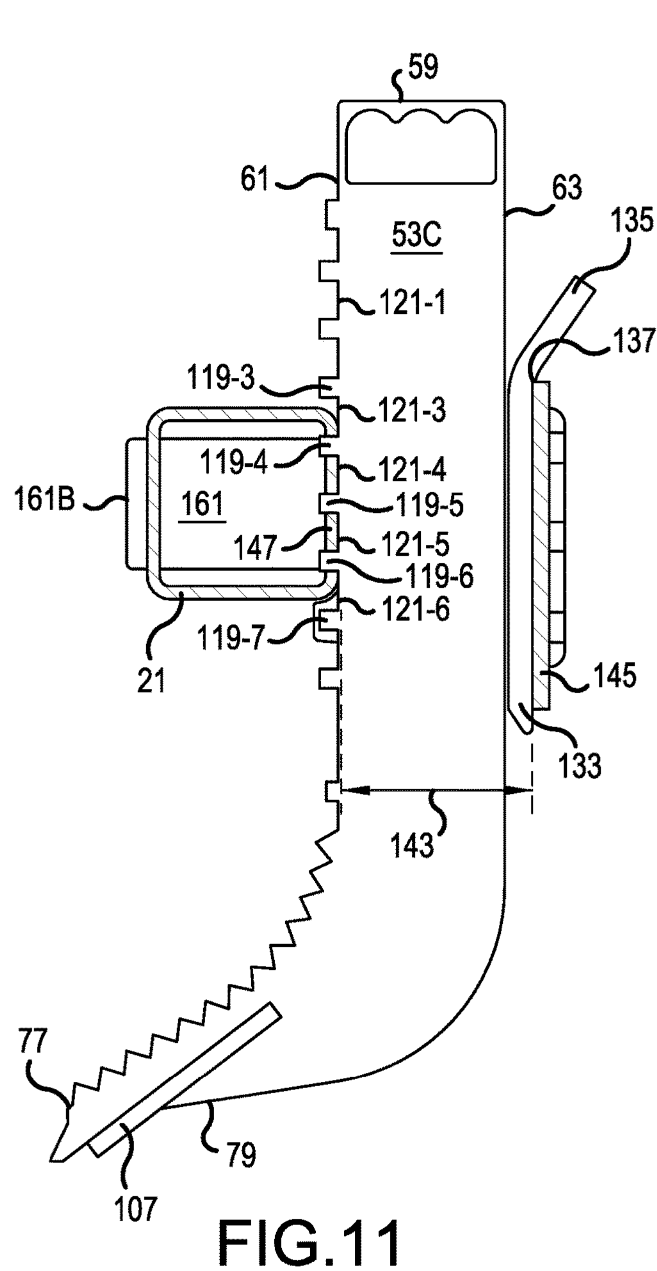
FIG. 11 is a cross sectional view taken along line XI-XI in FIG. 9.
Figure 12:
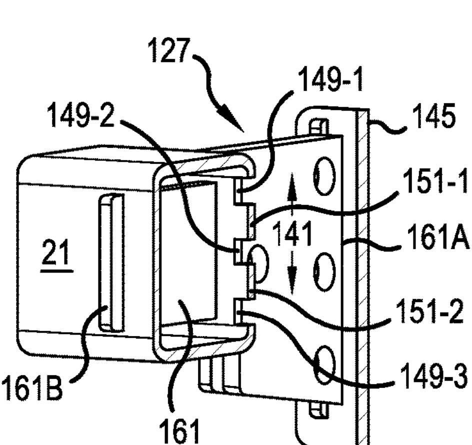
FIG. 12 is a front perspective view similar to the cross sectional view of FIG. 11 with the ripper shank removed.

FIG. 11 is a cross sectional view taken along line XI-XI in FIG. 9. FIG. 11 illustrates how the locking pin 131 secures the ripper shank plate 53C into the holder 127. The holder 127 is mounted to, or integrally formed with, elements of the attachment 11A. The holder 127 includes a pathway 141 with a pathway width 143 greater than a width of the short edge 59 of the generally rectangular portion 53C. The pathway 141 is formed between a stop wall 145 and a face 147 of the forward box beam 21. As shown in FIG. 12, the face 147 of the forward box beam 21 has through slots 149-1, 149-2 and 149-3 formed therein, which can be considered recesses. The remaining portions of the face 147 (between the through slots 149-1, 149-2 and 149-3) can be viewed as stays 151-1 and 151-2.

The stop wall 145 is rigidly attached to the forward box beam 21 by first and second standoffs 161 and 163. The first and second standoffs 161 and 163 may be formed by metal plates with first ends 161A and 163A attached e.g., welded, to the stop wall 145. Opposite second ends 161B and 163B of the first and second standoffs 161 and 163 are attached, e.g., welded, to the forward box beam 21. In a preferred embodiment, the second ends 161B and 163B pass through cut slots in the forward box beam 21 and are welded to opposite sides of the forward box beam 21 for added strength. A distance between the first and second standoffs 161 and 163 is set to be slight greater than the thickness T1 of the ripper shank plate 51C.

Because the pathway width 143 is larger than the short edge 59 and the protrusions 119, the short edge 59 of the ripper shank plate 53C can be fed upwardly into the pathway 141. When a desired depth for the dirt lifting slide 107 is achieved, the nearest protrusions 119 can be aligned to the through slots 149 in the forward box beam 21. The ripper shank plate 53A is then moved forward, so that the aligned protrusions 119 slide into the through slots 149 and the protrusions 119 rest upon upper surfaces of the stays 151.

At this point, the elongated section 133 of the locking pin 131 is inserted downwardly into the pathway 141 beside and behind the ripper shank plate 51C, so as to abut against the second long edge 63 of the generally rectangular portion 53C. When the locking pin 131 is fully seated, the rest stop 137 may abut the top of the stop wall 145. The locking pin 131 holds the protrusions 119, e.g., fourth, fifth and sixth protrusions 119-4, 119-5 and 119-6, within the through slots 149, e.g., first, second and third through slots 149-1, 149-2 and 149-3, as shown in FIG. 11. The ripper shank plate 51C is effective locked into the holder 127 until the locking pin 131 is removed. When the locking pin 131 is removed, the height of the ripper shank plate 51C relative to the holder 127 may be adjusted using the handle 91C, and then the locking pin 131 may be replaced. For example, the first, second and third protrusions 119-1, 119-2 and 119-3 may be mated into the first, second and third through slots 149-1, 149-2 and 149-3 to lower the dirt lifting slide 107.

Although the ripper shank plates 51A, 51B and 51C have been illustrated as single plates, it is preferred that the ripper shank plates 51A, 51B and 51C be laminated for added strength. For example, the ripper shank plate 51C may be considered a first metal plate, and a second metal plate is formed in a same shape and size as the first metal plate. The second metal plate is then laminated onto the first metal plate in an aligned manner. This lamination process may be repeated to form three, four or more layers to produce a stronger ripper shank plate 51C. The same process may be used to form a laminated dirt lifting slide 107. In a preferred embodiment, the metal plates are formed of Hardox® 450 and may be laminated to form a desirable thickness, such as ⅓ inch to ³⁄₂ inch, such as ½ inch to ¾ inch.

Although the present invention has been described in connection with a box blade attachment, other attachments may use the ripper shanks and/or the ripper shank holders as taught herein. Such other implements may include, but are not limited to a rake drag, a loader bucket and a scarifier bar, as shown in U.S. Pat. Nos. 7,478,682; 7,540,331 and 10,024,029 and in US Patent Application Publication 2009/0050340, all of which are incorporated herein by reference. The ripper shanks could also be used with a cultivator to open trenches for a seeder mounted above and slightly behind the ripper shanks, which places seeds into the opened trenches. The attachment of the present invention may be used in conjunction with a variety of vehicles, such as a farm tractor, a truck, a front-loader, a skid steer, a bull dozer, or other industrial or farm vehicles.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A ground ripping implement comprising:

a generally flat metal plate residing in a first plane, and having a generally rectangular portion, a curved portion and a generally triangular portion all integrally formed as one piece, with said curved portion residing between said generally rectangular portion and said generally triangular portion;

wherein said generally rectangular portion has a short edge and opposed first and second long edges, a lower boundary of said generally rectangular portion opposite said short edge being integrally formed with said curved portion;

wherein said curved portion has an upper boundary integrally formed with said lower boundary of said generally rectangular portion, and a forward boundary;

wherein said generally triangular portion includes a rearward boundary integrally formed with said forward boundary of said curved portion, a first side edge and a second side edge;

a plurality of alternating protrusions and notches formed along one of said first long edge and said second long edge of said generally rectangular portion, wherein said protrusions are evenly spaced from each other; and a holder mounted to, or integrally formed with, elements of an attachment for a vehicle, wherein said holder includes:

a pathway formed between a stop wall and an outer face of a box beam, with a pathway width between said stop wall and said outer face of said box beam being greater than a width of said short edge of said generally rectangular portion;

said pathway also being between first and second standoffs attaching said stop wall to said box beam, with a distance between said first and second standoffs set to be slightly greater than a thickness of said generally flat metal plate; and slots and stays formed on one side of said pathway, said stays being spaced apart so as to align with, and fit into, at least two of said plurality of notches formed on said generally rectangular portion.

2. The implement of claim 1, further comprising:

a removable pin, inserted into said pathway beside of and in abutment with said generally rectangular portion, wherein said pin holds at least two of said stays of said pathway within said at least two of said plurality of notches formed on said generally rectangular portion until said pin is removed.

3. The implement of claim 1, wherein said attachment for a vehicle is selected from one of a box blade, a rake, and a bucket.

4. The implement of claim 1, wherein said plurality of alternating protrusions and notches are formed along said first long edge of said generally rectangular portion, and said slots and stays are formed through said outer face of said box beam.

5. The implement of claim 1, further comprising:

a dirt lifting slide attached to said generally triangular portion, wherein said dirt lifting slide extends in a second plane, which is generally perpendicular to said first plane.

6. The implement of claim 5, wherein said first side edge of said generally triangular portion forms a narrow surface to contact with compacted soil; and wherein said dirt lifting slide has a front face, and is attached to said generally triangular portion at a position between said first side edge and said second side edge, and wherein said narrow surface of said first edge of said generally triangular portion is forward of said front face of said dirt lifting slide to break compacted soil and reduce stress placed upon said front face of said dirt lifting slide.

7. The implement of claim 6, further comprising:

a first plurality of serrated teeth formed by alternating peaks and valleys formed along said first side edge of said generally triangular portion to cut roots and loosen dirt before the dirt is lifted by said dirt lifting slide.

8. The implement of claim 6, wherein said dirt lifting slide is generally parallel to said first side edge of said generally triangular portion.

9. The implement of claim 6, wherein said dirt lifting slide is generally flat and extends away from said triangular portion on both sides of said first plane.

10. The implement of claim 9, further comprising:

a first slot formed completely through said generally triangular portion which enters within said second side edge and extends toward said curved portion, wherein a first opening dimension of said first slot exceeds a thickness of said dirt lifting slide, and wherein said dirt lifting slide resides within said first slot and is welded to said generally triangular portion.

11. The implement of claim 10, further comprising:

a second slot formed completely through said dirt lifting slide, wherein a second opening dimension of said second slot exceeds a thickness of said generally triangular portion, wherein said second slot is passed through said first slot so as to seat slot edges of said second slot of said dirt lifting slide against sidewall sections of said generally triangular portion or said curved portion or both, and so as to seat slot edges of said first slot of said generally triangular portion against sidewall sections of said dirt lifting slide, and wherein said dirt lifting slide is welded to said generally triangular portion or said curved portion or both.

12. The implement of claim 1, further comprising:

an opening or channel formed within said generally rectangular portion adjacent to said short edge, which functions as a handle, said opening or channel being spaced from said short edge of said generally rectangular portion by a barrier section of said generally rectangular portion.

13. The implement of claim 12, wherein said opening or channel includes first and second finger recesses.

14. The implement of claim 12, wherein said handle assists to position said protrusions and notches of said generally rectangular portion relative to said slots and stays of said holder to adjust a ripping depth of said ground ripping implement.

15. The implement of claim 14, wherein said opening or channel includes first and second finger recesses.

16. The implement of claim 14, wherein said opening or channel is a first channel spaced from said short edge of said generally rectangular portion by said barrier section of said generally rectangular portion and including a first finger recess and further comprising:

a second channel spaced from said short edge of said generally rectangular portion by said barrier section of said generally rectangular portion and including a second finger recess.

17. The implement of claim 14, wherein said opening or channel is an opening spaced from said short edge of said generally rectangular portion by said barrier section of said generally rectangular portion and includes first, second and third finger recesses.

* * * * *